United States Patent
Ueda et al.

[11] Patent Number: 5,986,642
[45] Date of Patent: Nov. 16, 1999

[54] COLOR ADJUSTMENT DEVICE

[75] Inventors: Masashi Ueda; Ryohei Komiya, both of Nagoya, Japan

[73] Assignee: Brother Kogyo Kabushiki Kaisha, Nagoya, Japan

[21] Appl. No.: 08/774,374

[22] Filed: Dec. 27, 1996

[30] Foreign Application Priority Data

Dec. 27, 1995 [JP] Japan ................................. 7-341670

[51] Int. Cl.$^6$ ............................................. G09G 5/02
[52] U.S. Cl. ........................................ 345/150; 345/186
[58] Field of Search ................................ 345/150, 186, 345/510, 188, 203, 11, 22; 395/135

[56] References Cited

U.S. PATENT DOCUMENTS

| | | | |
|---|---|---|---|
| 4,695,966 | 9/1987 | Takakura et al. | 364/521 |
| 4,794,382 | 12/1988 | Lai et al. | 345/150 |
| 5,150,458 | 9/1992 | Masuzaki et al. | 395/135 |
| 5,270,806 | 12/1993 | Venable et al. | 345/150 |
| 5,278,542 | 1/1994 | Smith et al. | 345/150 |
| 5,504,499 | 4/1996 | Horie et al. | 345/150 |
| 5,677,741 | 10/1997 | Yui | 345/150 |
| 5,719,639 | 2/1998 | Imamura | 345/150 |
| 5,844,542 | 7/1996 | Inoue et al. | 345/150 |

*Primary Examiner*—Amare Mengistu
*Attorney, Agent, or Firm*—Oliff & Berridge, PLC

[57] ABSTRACT

Two or more images, which are produced from the same image data but which are adjusted to have different color states, are displayed alternately on the same position of the screen at a predetermined timing. The operator can observe those images while continuously watching the same position on the screen. The operator can compare those images within a short period of time. Accordingly, the operator can easily compare the color states of those images with high accuracy. Because each of the images is displayed entirely over the screen, the operator can observe color states of even the intricate portions in the images.

20 Claims, 4 Drawing Sheets

COLOR ADJUSTMENT DEVICE

BACKGROUND OF THE INVENTION

1. Field of the Invention

The present invention relates to a color adjustment device for adjusting display colors of image data.

2. Description of the Related Art

A color adjustment device has been conventionally proposed to adjust colors to be outputted on an image output device. Before controlling a CRT or a color printer with image data to display or to record an original image, a color state of the image data is adjusted by the color adjustment device so that the image data will properly match the characteristics of the CRT or the printer. The thus color-adjusted image data can control the CRT or the printer to reproduce colors close to those of the original image. The color adjustment device is also used to change the image data so that the CRT or the printer can output images with their color states being different from that of the original image.

The color adjustment device is designed to change parameter values of the image data which are defined in the RGB colorimetric system or the Lab colorimetric system. The color adjustment device changes the parameter values dependent on an operator's inputted color adjustment data.

SUMMARY OF THE INVENTION

It is difficult for the operator to know which amount of color adjustment data will properly produce his/her desired color state. In order to solve this problem, the color adjustment device is conceivable to control the CRT to simultaneously display both the original image and a color-adjusted image. The color adjustment device produces the color-adjusted image through adjusting the original image with a certain amount of color adjustment data. Observing those images, the user visually knows how the original image will be changed according to the certain amount of color adjustment data.

The color adjustment device may also control the CRT to display, together with the original image, several differently-adjusted images each of which is obtained through adjusting the original image with a corresponding amount of color adjustment data. Comparing those differently-adjusted images with the original image, the operator can easily determine an amount of color adjustment data which can produce his/her desired color state.

Figure 1:
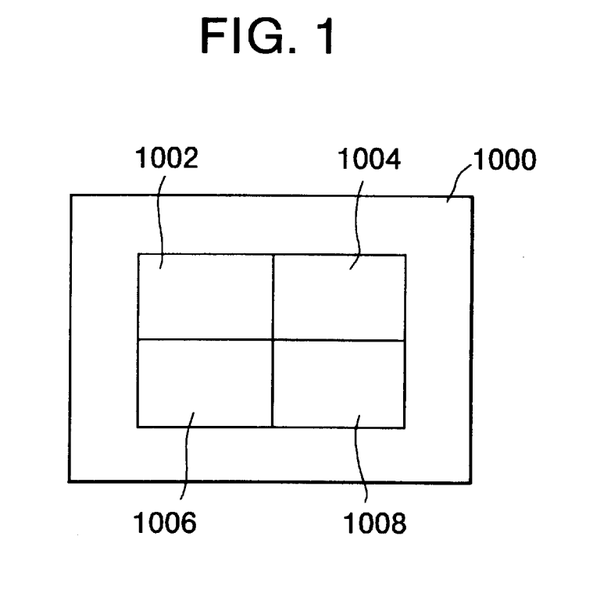
FIG. 1 illustrates a conceivable method how to display a plurality of images of different color states in a single screen.

FIG. 1 shows a screen 1000 of the CRT. The screen 1000 is divided into four image regions 1002, 1004, 1006, and 1008. The regions 1002–1008 are for displaying the original image, a first color-adjusted image, a second color-adjusted image, and a third color-adjusted image, respectively. The color adjustment device obtains the first through third color-adjusted images through adjusting the original image with different amounts of color adjustment data (i.e., first through third color adjustment data). The operator selects one from the images 1004–1008 that has a color state closest to his/her desired one. In response to the operator's selection; the color adjustment device sets color adjustment data (either one of the first through third color adjustment data) which can properly produce the operator's desired image.

Because the CRT screen 1000 is divided into the four regions 1002–1008, even though the original image is originally displayed over the entire screen 1000, each of the regions 1002–1008 can display only a quarter part of the corresponding image. Accordingly, the operator may not observe the entire part of each image. The operator may not easily know which of the images 1004–1008 is the closest to the operator's desired color state It is noted that each of the regions 1002–1008 may be controlled to display a ¼ size-reduced image. In this case, however, the displayed images have degraded resolutions. The operator may not easily perceive color states of intricate portions in those images.

It is further noted that the operator has to successively shift his/her vision (focal point) from a point in one image to a corresponding point in the next image, thereby comparing the color states of those points. When the operator shifts his/her vision between the points in the two images, however, the operator will have to see other colors located between those points. Also, it takes a certain amount of time to shift his/her vision between those points. Accordingly, the operator's memory fades in the time it takes him/her to shift his/her vision from one image to the next. It therefore becomes difficult to accurately compare the color states of the images 1002–1008.

It is therefore, an object of the present invention to overcome the above-described drawbacks, and to provide an improved color adjustment device which can simplify the color adjustment operation.

In order to attain these and other objects, the present invention provides a color adjustment device for adjusting color display state of image data, the device comprising: storage means for storing a set of image data; display means provided with a screen, the display means being capable of displaying a color image on the screen; input means for inputting color adjustment data; color adjusting means capable of adjusting color state of the set of image data based on the inputted color adjustment data to thereby produce at least one set of color-adjusted image data; and display control means for controlling the display means to alternately display the set of image data and the at least one set of color-adjusted image data at the same position on the screen at a predetermined timing.

According to another aspect, the present intention provides a color adjustment device for adjusting color display state of image data, the device comprising: input means for inputting image data; display means provided with a screen, the display means being capable of displaying a color image on the screen; and display control means for controlling the display means to alternately display a plurality of images at the same position on the screen, the plurality of images being produced from the inputted image data to present different color-adjusted states. The color adjustment device may further comprise color-adjusted state selection means for selecting one of the plurality of images.

The display control means may include: input means for inputting color adjustment data; color adjusting means for adjusting color state of the image data based on the inputted color adjustment data to thereby produce color-adjusted image data; and a display controller for controlling the display means to alternately display an image based on the image data and a color-adjusted image based on the color-adjusted image data at the same position on the screen. The display control means may further include: adjustment data changing means for changing the inputted color adjustment data into changed color adjustment data, the color adjusting means adjusting color state of the image data also based on the changed color adjustment data to thereby produce changed color-adjusted image data, the display controller controlling the display means to display the image based on the image data, the color-adjusted image based on the color-adjusted image data, and a further changed color-adjusted image based on the changed color-adjusted image data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A color adjustment device according to preferred embodiments of the present invention will be described while referring to the accompanying drawings wherein like parts and components are designated by the same reference numerals.

A color adjustment device according to a first embodiment will be described below with reference to FIGS. 2 through 4 and 7.

Figure 2:
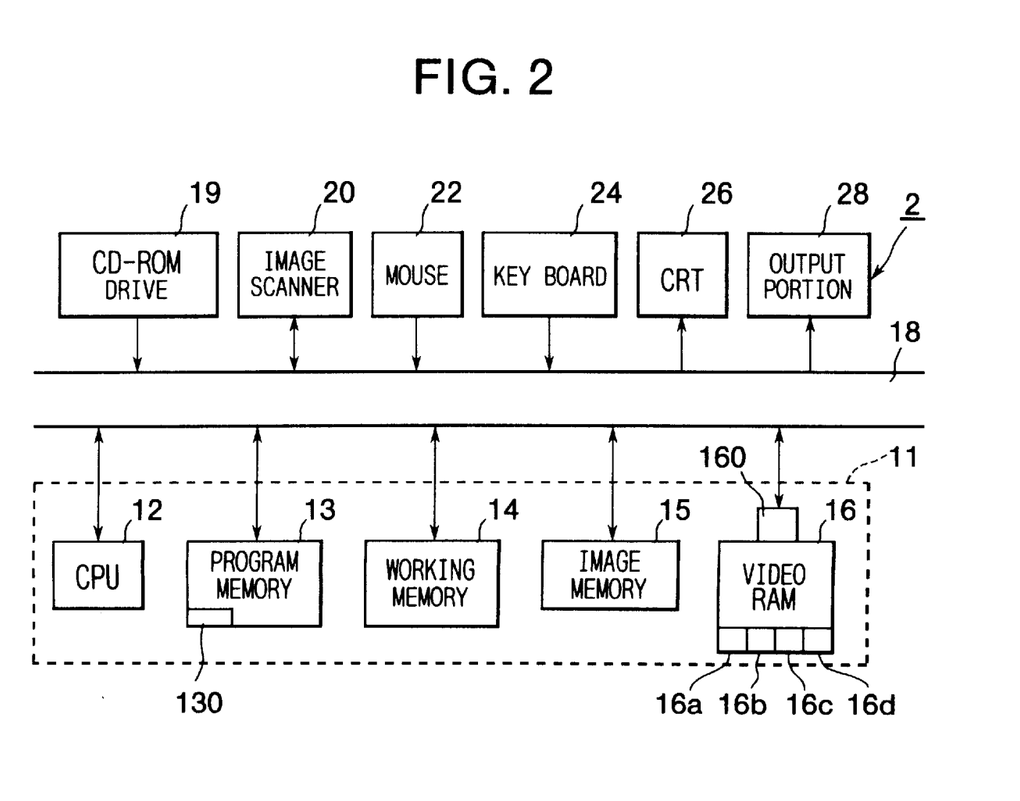
FIG. 2 is a block diagram showing an essential part of a color adjustment device of a preferred first embodiment according to the present invention.

FIG. 2 is a block diagram of an essential part of a color adjustment device 2 of the first embodiment according to the present invention.

The main part of the color adjustment device 2 is constructed from a microcomputer portion 11 shown in FIG. 2. The microcomputer portion 11 includes: a central processing unit (CPU) 12; a program memory 13 constructed from an EEPROM; a working memory 14 constricted from a RAM; an image memory 15 constructed from a RAM; and a video RAM 16. The microcomputer portion 11 is connected via a system bus 18 to a CD-ROM driver 19, an image scanner 20, a mouse input device 22, a key board 24, a CRT display 26, and an output portion 28.

The CPU 12 is for performing a color adjustment operation as will be described later. The program memory 13 stores therein various programs to be executed by the CPU 12. The working memory 14 is for temporarily storing data to be used by the CPU 12 when executing the programs stored in the program memory 13. For example, the working memory 14 stores data indicative of a latest display switching operation. The image memory 15 is for storing image data to be subjected to the color adjustment operation and for storing the color-adjusted image data.

The video RAM 16 is for storing graphic image data to be displayed on the CRT display 26. The video RAM 16 has a certain amount of storage capacity and is capable of storing four screens' worth of high-resolution image data to be displayed by the CRT display 26. In more concrete terms, the video RAM 16 is formed with four memory areas (which will be referred to as "first through fourth screen areas 16a–16d" hereinafter) each for storing a corresponding one of the four screens' worth of image data. The video RAM 16 is further provided with an I/O port 160. The CPU 12 can control the I/O port 160 to select one of the first through fourth screen areas 16a–16d. Image data stored in the selected screen area will be displayed on the CRT display 26.

The output portion 28 serves as an interface for outputting, to an external output device (not shown), image data which has been adjusted by the microcomputer portion 11 and is stored in the image memory 15. The external device is an electrophotographic color printer, for example, for recording the supplied image data onto a sheet of paper. The CD-ROM driver 19 is for reading image data from a CD-ROM mounted therein. The CD-ROM driver 19 reads out image data from the CD-ROM according to an instruction from the microcomputer portion 11. The CD-ROM driver 19 then inputs the read image data, as original image data, in the image memory 15. The image scanner 20 is for reading an original image such as a photograph and a printed matter mounted therein. The image scanner 20 also inputs the read out image data, as original image data, in the image memory 15. The mouse input device 22 is for detecting the two-dimensional movement of an operator's hand and moving a mouse cursor, displayed on the CRT display 26, according to the detected result. The mouse input device 22 further detects the operator's clicking operation achieved on two click buttons provided thereto.

Figure 7:
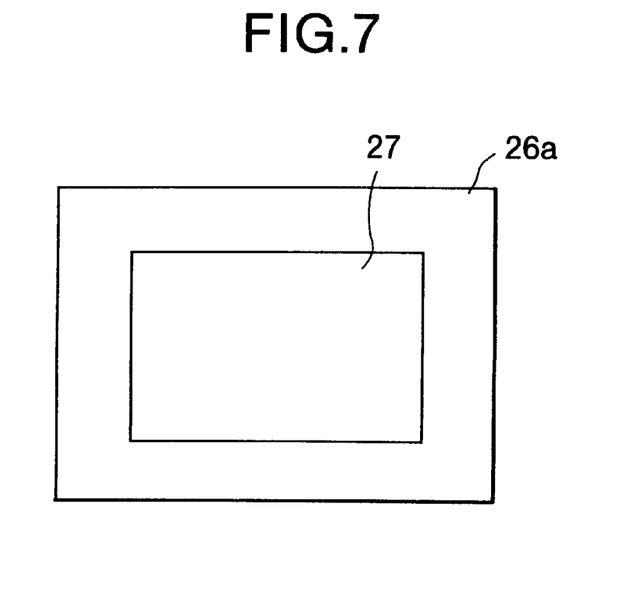
FIG. 7 illustrates how to display a plurality of images of different color states in a single screen according to the present invention.

The key board 24 is for inputting the operator's designated data and instructions. The CRT display 26 is provided with a screen 26a having a display region 27 as shown in FIG. 7.

With the above-described structure, the color adjustment device 2 performs the color adjustment process as described below.

Figure 3:
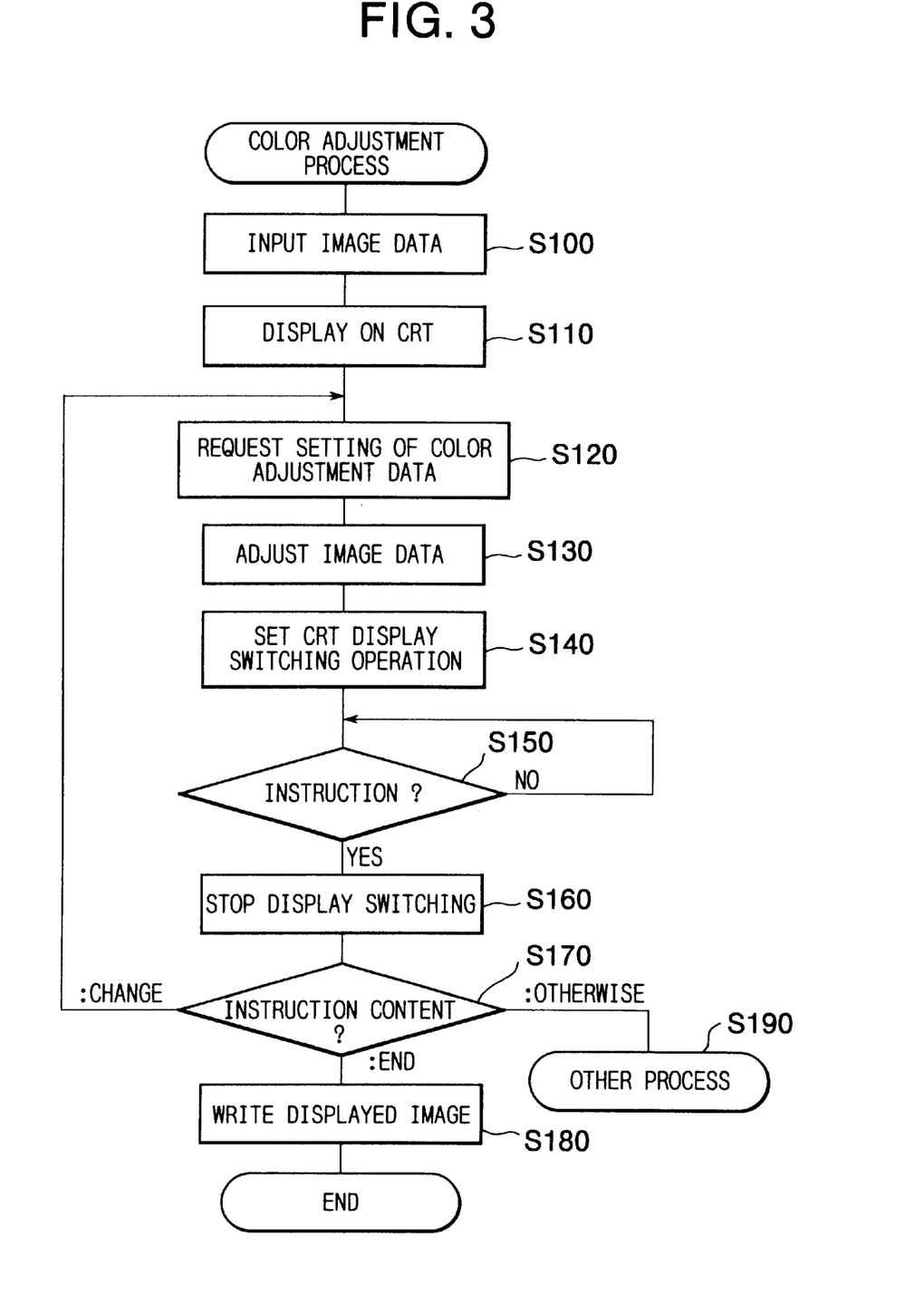
FIG. 3 is a flowchart showing a color adjustment process according to the embodiment.

When the color adjustment device 2 is powered on, the CRT display 26 is controlled to display a menu screen for displaying several processes, including the color adjustment process, capable of being performed by the color adjustment device 2. When the operator manipulates the mouse input device 22 to select the color adjustment process, the color adjustment process starts as shown in FIG. 3.

When the color adjustment process starts, image data is read out and then inputted in the image memory 15 in S100. That is, when a CD-ROM is set as an original in the CD-ROM driver 19, the CPU 12 controls the CD-ROM driver 19 to read out image data from the CD-ROM. When a photograph or the like is set as an original on the image scanner 20, on the other hand, the CPU 12 controls the image scanner 20 to read out the photograph or the like and to produce image data. In this example, thus read out image data is defined in the RGB colorimetric system. The image data, defined for each picture element of the original image, includes: one byte of R data (R component value) indicative of its red color component, one byte of G data (G component value) indicative of its green color component, and one byte of B data (B component value) indicative of its blue color component. The image data can therefore represent a color state of the corresponding picture element as either one of about 16,700,000 color states. The image data is stored in the image memory 15.

Then, in S110, the CPU 12 writes the image data, which is now stored in the image memory 15, in the first screen area 16a of the video RAM 16. The I/O port 160 is initially set to access the first screen area 16a and control the CRT display 26 to display image data in the first screen area 16a. Accordingly, the CRT display 26 displays the original image on the display region 27 as shown in FIG. 7.

Next, in S120, the CPU 12 controls the CRT display 26 to display, on a part of the display region 27, a request that the operator should set color adjustment data desired to be used during a RGB color adjustment operation. For example, the CRT display 26 displays a request to ask the operator to input color adjustment values $\Delta R0$, $\Delta G0$, and $\Delta B0$ desired to be added to the R, G, and B component values of the image data.

When the operator inputs the color adjustment values $\Delta R0$, $\Delta G0$, and $\Delta B0$, the CPU 12 adjusts, in S130, the R, G, and B values for each picture element in accordance with the inputted color adjustment data $\Delta R0$, $\Delta G0$, and $\Delta B0$. The thus adjusted image data is written in the second screen area 16b of the video RAM 16. For example, the R, G, and B values for each picture element are added with the color adjustment data $\Delta R0$, $\Delta G0$, and $\Delta B0$, and then written in the second screen area 16b.

At this time, the video RAM 16 stores therein the original image data in the first screen area 16a, and the color-adjusted image data in the second screen area 16b. The CRT display 26 continues displaying the original image because the I/O port 160 is initially set to access the first screen area 16a and control the CRT display 26 to display image data of the first screen area 16a as described above.

Next, in S140, the CPU 12 starts a display switch setting process in a time-shearing manner, and awaits for input of any instructions in S150.

The time-shearing display switch setting process is for allowing an interrupt routine to be executed to switch a display state at a predetermined time interval.

Figure 4:
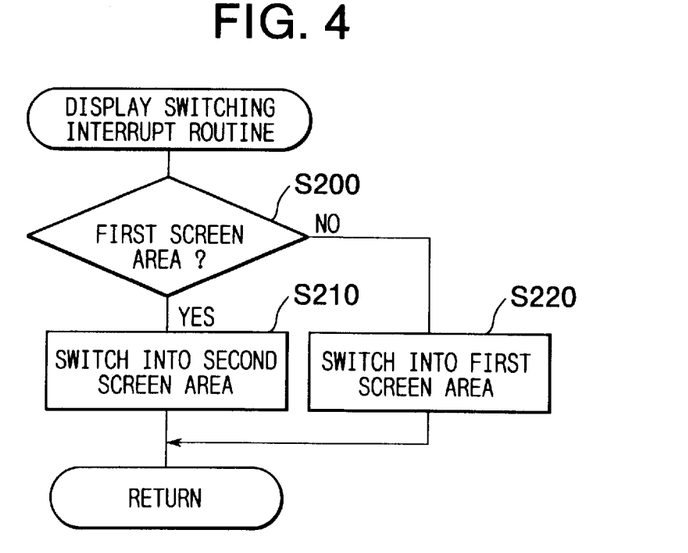
FIG. 4 is an interrupt routine executed during the color adjustment process of FIG. 3.

The display switch interrupt routine is shown in FIG. 4.

The interrupt routine is performed at an interval of one second.

When the interrupt routine is started, the CPU 12 examines in S200 the state of the I/O port 160 and data indicative of the latest switching operation which is stored in the working memory 14. The CPU 12 then judges whether or not the CRT display 26 is presently displaying image data stored in the first screen area 16a. When the CRT display 26 is presently displaying image data stored in the first screen area 16a (yes in S200), the CPU 12 controls the I/O port 160 to access the second screen area 16b and control the CRT display 26 to display image data stored in the second screen area 16b in S210. As a result, the original image is erased from the display region 27, and the color-changed image is displayed on the display region 27. Then, the interrupt routine is temporarily stopped.

When one second elapses from the last interrupt routine, the interrupt routine is again actuated. Because the display region 27 is now displaying the color-adjusted image data stored in the second screen area 16b, the program now proceeds from S200 to S220 where the color-adjusted image is erased from the display region 27, and the original image is displayed on the display region 27. Then, the interrupt routine is again temporarily stopped.

Thus, the display content of the display region 27 automatically switches between the original image and the color-adjusted image at the time interval of one second. Accordingly, the CRT display 26 alternately displays, at the same point of the display region 27, both the original image data and the color-adjusted image data for the same picture element of the corresponding image. The operator may not have to shift his/her vision along the display region 27 to compare the original image data and the color-adjusted image data. The operator can accurately compare the original image data and the color-adjusted image data while merely continuing observing the same point on the display region 27. Because the display state of the display region 27 instantaneously switches between the original state and the color-adjusted state, the operator can observe the differences between the original state and the color-adjusted state within a short period of time. The operator can therefore accurately grasp the difference between the original state and the color-adjusted state.

Additionally, the CRT display 26 displays each of the original image and the color-adjusted image entirely over the display region 27. The CRT display 26 can therefore display both the original image and the color-adjusted image with high resolution. Also in this respect, the operator can accurately grasp the difference between the original state and the color-adjusted state.

When the operator inputs some instruction through manipulating the mouse input device 22 or the key board 24 (yes in S150), the CPU 12 receives the instruction as an instruction to stop the display switching operation. The CPU 12 therefore stops switching the display state in S160. That is, the interrupt routine of FIG. 4 is prohibited from being executed. As a result, the CRT display 26 continues displaying either one of the original image and the color-adjusted image that is being displayed when the instruction is inputted in S150. The CRT display 26 will not switch the display state.

Then, the CPU 12 judges the content of the inputted instruction in S170. When the inputted instruction is to change the color adjustment values $\Delta R0$, $\Delta G0$, and $\Delta B0$, the program returns to S120 where the CRT display 26 requests the operator to set his/her desired new adjustment values $\Delta R0$, $\Delta G0$, and $\Delta B0$.

When the inputted instruction is to completely terminate the process, the presently-displayed image data is transferred in S180 from the corresponding screen area of the video RAM 16 to the image memory 15. Then, the program is terminated. The image data will be further transferred from the image memory 15 to the output portion 28, from which the image data will be further transferred to the external output device (printer). The external output device will print the image data. Although not shown in the drawing, when the inputted instruction is to store the color-adjusted image data, the process of S180 is also performed, but the program returns to S120 from S180. The operator can therefore adjust the presently-adjusted image after observing the presently-adjusted image printed by the external output device.

When the inputted instruction is to perform other operations, on the other hand, the program proceeds to S190 where the instructed operation is performed.

If the color-adjusted image data is stored in the image memory 15 in S180 of the present color adjustment operation, when the color adjustment operation of FIG. 3 is performed next, the color-adjusted image data is subjected to the color-adjustment operation as original image data.

A second embodiment of the color adjustment device will be described below with reference to FIGS. 2, 3, and 5–7.

The color adjustment device 2 of the second embodiment is the same as that of the first embodiment except for the following points.

According to the present embodiment, the program memory 13 previously stores therein a screen area table 130 which lists control data for controlling the I/O port 160 to access the first through fourth screen areas 16a–16d in correspondence with address numbers "n" of 1, 2, 3, and 4. In more concrete terms, the table lists therein: control data indicative of an access to the first screen area 16a in correspondence with the address number "n" of one (1); control data indicative of an access to the second screen area 16b in correspondence with the address number "n" of two (2); control data indicative of an access to the third screen area 16c in correspondence with the address number "n" of three (3); and control data indicative of an access to the fourth screen area 16d in correspondence with the address number "n" of four (4).

The working memory 14 is designed to store an address number "n" indicative of a presently-achieved display switch interrupt routine. Accordingly, the working memory 14 and the screen area table 130 cooperate to determine how to control the I/O port 160 to access either one of the first through fourth screen areas 16a–16d in each display state interrupt routine.

The program memory 13 also stores therein correction values dR, dG, and dB used for changing the user's inputted color adjustment values $\Delta R0$, $\Delta G0$, and $\Delta B0$.

With the above-described structure, the color adjustment device 2 of the present embodiment performs a color adjustment operation.

The color adjustment operation will be described below with reference to FIGS. 3, 5 and 6.

Figure 5:
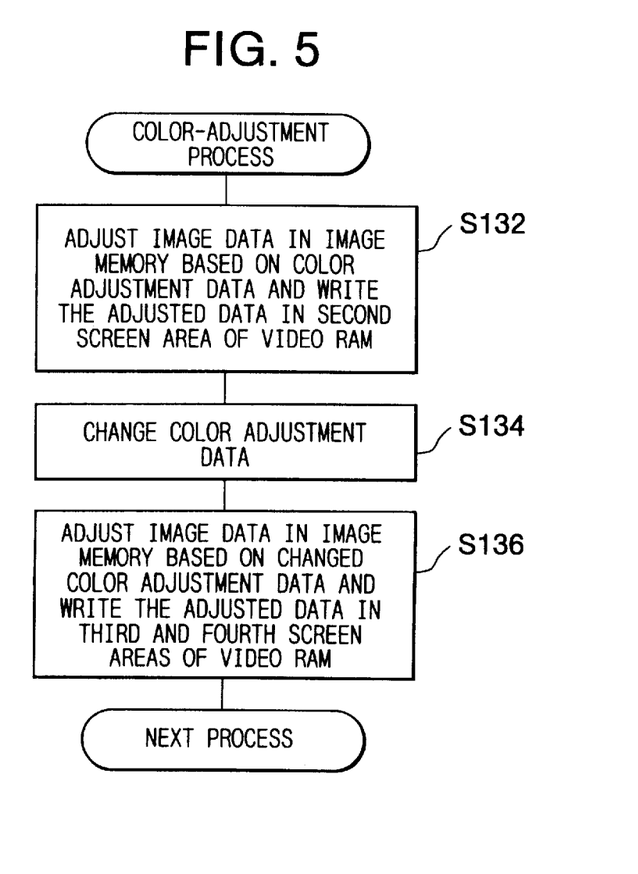
FIG. 5 is a flowchart showing a part of a color adjustment process according to a second embodiment.
Figure 6:
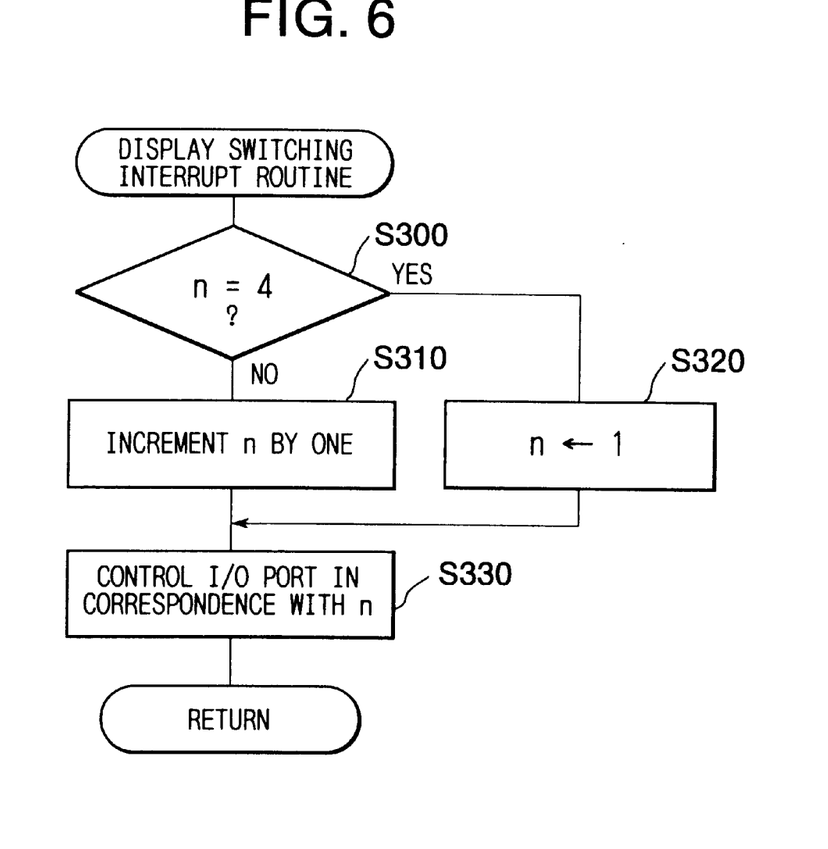
FIG. 6 is an interrupt routine executed during the color adjustment process according to the second embodiment.

The color adjustment operation of the present embodiment is the same as that of the first embodiment except that a sub-routine shown in FIG. 5 is executed in the color-adjustment step of S130 and that an interrupt routine shown in FIG. 6 is executed in place of the interrupt routine of FIG. 4.

In more concrete terms, the CPU 12 starts performing the color adjustment subroutine of FIG. 5 after the processes of S100–S120 are performed. During the color adjustment process of FIG. 5, first in S132, the CPU 12 adds the operator's inputted color adjustment values $\Delta R0$, $\Delta G0$, and $\Delta B0$ to the R, G, and B values of the original image data stored in the image memory 15. The thus color-adjusted image data (which will be referred to as "first color-adjusted image data" hereinafter) is written in the second screen area 16b of the video RAM 16.

Then, the CPU 12 changes the operator's color adjustment values $\Delta R0$, $\Delta G0$, and $\Delta B0$ in S134. In more concrete terms, the CPU 12 changes the values $\Delta R0$, $\Delta G0$, and $\Delta B0$ by the correction values dR, dG, and dB (stored in the program memory 13), to thereby determine a new set of color adjustment values $\Delta R1$, $\Delta G1$, and $\Delta B1$ and another new set of color adjustment values $\Delta R2$, $\Delta G2$, and $\Delta B2$. That is, the set of color adjustment values $\Delta R1$, $\Delta G1$, and $\Delta B1$ and the set of color adjustment values $\Delta R2$, $\Delta G2$, and $\Delta B2$ are determined in the following manner:

$$\Delta R1 = \Delta R0 + dR$$
$$\Delta G1 = \Delta G0 + dG$$
$$\Delta B1 = \Delta B0 + dB$$
$$\Delta R2 = \Delta R0 - dR$$
$$\Delta G2 = \Delta G0 - dG$$
$$\Delta B2 = \Delta B0 - dB$$

That is, the new set of color adjustment values $\Delta R1$, $\Delta G1$, and $\Delta B1$ is obtained by adding the correction values dR, dG, and dB to the operator's inputted color adjustment values $\Delta R0$, $\Delta G0$, and $\Delta B0$. The other set of color adjustment values $\Delta R2$, $\Delta G2$, and $\Delta B2$ is obtained by subtracting the correction values dR, dG, and dB from the operator's inputted color adjustment values $\Delta R0$, $\Delta G0$, and $\Delta B0$.

Thus, the sets color adjustment values $\Delta R1$, $\Delta G1$, and $\Delta B1$ and $\Delta R2$, $\Delta G2$, and $\Delta B2$ are obtained. The color adjustment values $\Delta R1$, $\Delta G1$, and $\Delta B1$ have amounts larger than those of the operator's inputted color adjustment values $\Delta R0$, $\Delta G0$, and $\Delta B0$. The set of color adjustment values $\Delta R1$, $\Delta G1$, and $\Delta B1$ will therefore adjust the color state of the original image at a larger degree than the operator's inputted set of color adjustment values $\Delta R0$, $\Delta G0$, and $\Delta B0$. The set of color adjustment values $\Delta R1$, $\Delta G1$, and $\Delta B1$ will therefore be referred to as a set of increased color-adjusted values hereinafter. The color adjustment values $\Delta R2$, $\Delta G2$, and $\Delta B2$ have amounts smaller than those of the operator's inputted color adjustment values $\Delta R0$, $\Delta G0$, and $\Delta B0$. The set of color adjustment values $\Delta R2$, $\Delta G2$, and $\Delta B2$ will therefore adjust the color state of the original image at a smaller degree than the operator's inputted set of color adjustment values $\Delta R0$, $\Delta G0$, and $\Delta B0$. The set of color adjustment values $\Delta R2$, $\Delta G2$, and $\Delta B2$ will therefore be referred to as a set of decreased color-adjusted values hereinafter.

Then, in S136, the original image data, stored in the image memory 15, is adjusted by the set of increased color adjustment values $\Delta R1$, $\Delta G1$, and $\Delta B1$. That is, the R, G, and B values of the original image data for each picture element are added with the color adjustment values $\Delta R1$, $\Delta G1$, and $\Delta B1$. The resultant R, G, and B values, indicative of a second color-adjusted image, are then written in the third screen area 16c of the video RAM 16. Next, the original image data is adjusted by the set of decreased color adjustment values and $\Delta R2$, $\Delta G2$, and $\Delta B2$. That is, the R, G, and B values of the original image data for each picture element are added with the color adjustment values $\Delta R2$, $\Delta G2$, and $\Delta B2$. The resultant R, G, and B values, indicative of a third color-adjusted image, are then written in the fourth screen area 16d of the video RAM 16.

Then, in S140, the CPU 12 performs a time-shearing display switching process, and waits for some instructions in S150.

Similarly to the first embodiment, the display switching process of S140 is for allowing an interrupt routine of FIG. 6 to be executed for switching the CRT display state. The interrupt routine of FIG. 6 is executed at the time interval of one second.

When the interrupt routine starts, the CPU 12 refers to the address number "n" which is being presently stored in the working memory 14 and judges whether or not the present address number "n" is equal to four (4) in S300. Because the address number "n" is initially set to zero (0) (no in S300), the CPU 12 increments "n" by one (1) in S310. As a result, the address number "n" becomes one (1).

In S330, the CPU 12 refers to the control data which is stored in the screen area table 130 in correspondence with the present number "n". Because "n" is now equal to one (1), the CPU 12 controls the I/O port 160 to access the first screen area 16a. Accordingly, the CRT display 26 is controlled to display the original image. Then, the interrupt routine is temporarily stopped.

When one second elapses after the above-described interrupt routine, a next interrupt routine is executed. In this case, because "n" is equal to one (1), the program proceeds from S300 to S310, where the number "n" is incremented to two (2). In S330, the CPU 12 refers to the screen area table 130, and controls the I/O port 160 to access the second screen area 16b. As a result, the CRT display 26 starts displaying the first color-adjusted image which has been adjusted by the operator's inputted color adjustment values ΔR0, ΔG0, and ΔB0. Then, the interrupt routine is temporarily stopped.

Then, during a further next interrupt routine, the program proceeds from S300 to S310 where the number "n" is incremented to three (3). In S330, the CPU 12 refers to the table 130, and controls the I/0 port 160 to access the third screen area 16c. As a result, the CRT display 26 starts displaying the second color-adjusted image which has been adjusted by the increased color adjustment values ΔR1, ΔG1, and ΔB1. Then, the interrupt routine is temporarily stopped.

During a next interrupt routine, the program again proceeds from S300 to S310 where the number "n" is incremented to four (4). In S330, the CPU 12 refers to the table 130, and controls the I/O port 160 to access the fourth screen area 16d. As a result, the CRT display 26 starts displaying the third color-adjusted image which has been adjusted by the decreased color adjustment values ΔR2, ΔG2, and ΔB2. Then, the interrupt operation is temporarily stopped.

During a next interrupt routine, because "n" is four (4), the program proceeds from S300 to S320 where "n" is set to one (1). Accordingly, in S330, the CPU 12 refers to the table 130, and controls the I/O port 160 to access the first screen area 16a. As a result, the CRT display 26 starts displaying the original Image. Then, the interrupt routine is temporarily stopped.

Thus, as the interrupt routine is repeatedly performed by the time interval of one second, the CRT display 26 successively displays: the original image; the first image adjusted by the operator's inputted color adjustment values ΔR0, ΔG0, and ΔB0; the second image adjusted by the increased color adjustment values ΔR1, ΔG1, and ΔB1; and the third image adjusted by the decreased color adjustment values ΔR2, ΔG2, and ΔB2. The CRT display 26 continues cyclically displaying those four images until the operator inputs some instructions in S150.

Especially, according to this embodiment, three types of color-adjusted images are prepared and displayed on the display region 27. The first color-adjusted image is prepared according to the color adjustment values ΔR0, ΔG0, and ΔB0 originally designated by the operator. The second color-adjusted image is prepared according to the color adjustment values ΔR1, ΔG1, and ΔB1 which have values larger than the inputted color adjustment values ΔR0, ΔG0, and ΔB0. In other words, the second color-adjusted image has been adjusted at a larger degree than the first color-adjusted image. On the other hand, the third color-adjusted image is prepared according to the color adjustment values ΔR2, ΔG2, and ΔB2 which have values smaller than the inputted color adjustment values ΔR0, ΔG0, and ΔB0. In other words, the third color-adjusted image has been adjusted at a smaller degree than the first color-adjusted image. Because all the three color-adjusted images are thus displayed on the display area 27, the operator can easily know whether or not his/her designated adjustment values ΔR0, ΔG0, and ΔB0 have too large values or too small values. The operator can easily correct for his/her designated adjustment values ΔR0, ΔG0, and ΔB0.

When the operator inputs some instructions (yes in S150) while the display area 27 successively displays the above-described four images, the program proceeds to S160. Then, the processes S160 to S110 are performed in the same manner as in the first embodiment.

It is noted that the operator can input in S150 an instruction to change an order of displaying the four images. In this case, a display order changing operation is performed in S190 as described below.

In order to change the order in which the first through fourth screen areas 16a–16d are displayed, the CPU 12 rewrites the screen area table 130. It is now assumed that the operator desires that the CRT display 26 will successively display: the first image adjusted by the inputted color adjustment values ΔR0, ΔG0, and ΔB0; the original image; the second image adjusted by the increased color adjustment values ΔR1, ΔG1, and ΔB1; and the third image adjusted by the decreased color adjustment values ΔR2, ΔG2, and ΔB2. In this case, the CPU 12 rewrites the table 130 so as to store control data indicative of an access to the second screen area 16b in correspondence with the number "n" of 1 and control data indicative of an access to the first screen area 16a in correspondence with the number "n" of 2.

According to this display order changing operation, the CRT display 26 will display the original image directly before displaying the second image adjusted by the increased color adjustment values ΔR1, ΔG1, and ΔB1. The operator will more easily grasp differences between the color states of the original image and the second image adjusted by the increased color adjustment values ΔR1, ΔG1, and ΔB1.

It is further noted that the operator can input in S150 an instruction to decrease the maximum number of the number "n" in order to decrease the total number of images to be displayed on the CRT display 26. In this case, an image number decreasing operation is performed in S190 as described below.

In this case, the CPU 12 rewrites the program of the interrupt routine of FIG. 6 to decrease the reference number "4" which is to be compared with the present number "n" in S300. For example, the CPU 12 sets the reference number to "3". In this case, the CRT display 26 will display only three images in total. Similarly, when the CPU 12 sets the reference number to "2", the CRT display 26 will display only two images in total.

Alternatively, when the video RAM 16 can be formed with more than four screen areas, the CPU 12 may set the reference number to a number greater than four (4). The CRT display 26 will display more than four images in total. When the operator inputs an instruction to change the display order while simultaneously instructing to change of the reference number, the CRT display 26 will display images of the operator's desired number at the operator's desired order.

It is further noted that the operator can instruct in S150 to change the time interval for executing the display switching interrupt routine.

The set of increased color adjustment values ΔR1, ΔG1, and ΔB1 and the set of decreased color adjustment values ΔR2, ΔG2, and ΔB2 may be obtained through various manners other than that described above. For example, the set of increased color adjustment values ΔR1, ΔG1, and ΔB1 may be obtained through multiplying the operator's inputted color adjustment values ΔR0, ΔG0, and ΔB0 by correction coefficients Kr1, Kg1, and Kb1 wherein the correction coefficients Kr1, Kg1, and Kb1 have values higher than one (Kr1, Kg1, and Kb1>1). The set of decreased color adjustment values ΔR2, ΔG2, and ΔB2 may be obtained through multiplying the operator's inputted color adjustment values ΔRC, ΔG0, and ΔB0 by other correction coefficients Kr2, Kg2, and Kb2 wherein the correction coefficients Kr2, Kg2, and Kb2 have values in the range of 0 to 1 (0<Kr2, Kg2, and Kb2<1). The correction coefficients Kr1, Kg1, Kb1, Kr2, Kg2, and Kb2 may be stored in the program memory 13.

That is, the sets of color adjustment values ΔR1, ΔG1, and ΔB1 and ΔR2, ΔG2, and ΔB2 may be obtained by the following equations:

$$\Delta R1 = \Delta R0 \cdot Kr1$$

$$\Delta G1 = \Delta G0 \cdot Kg1$$

$$\Delta B1 = \Delta B0 \cdot Kb1$$

$$\Delta R2 = \Delta R0 \cdot Rr2$$

$$\Delta G2 = \Delta G0 \cdot Rg2$$

$$\Delta B2 = \Delta B0 \cdot Kb2$$

Thus obtained increased color adjustment values ΔR1, ΔG1, and ΔB1 have amounts larger than those of the operator's inputted color adjustment values ΔR0, ΔG0, and ΔB0. The decreased color adjustment values ΔR2, ΔG2, and ΔB2 have values smaller than those of the operator's inputted color adjustment values ΔR0, ΔG0, and ΔB0.

While the invention has been described in detail with reference to the specific embodiments thereof, it would be apparent to those skilled in the art that various changes and modifications may be made therein without departing from the spirit of the invention.

In the above-described embodiments, the CRT display 26 switches display of images according to the interrupt routine which is repeatedly performed at the predetermined interval. However, the CRT display 26 may switch display of images according to the operator's inputted instruction to switch display. For example, the CRT display 26 may be controlled to display an image switching button on the screen 27. The CPU 12 performs the interrupt routine of FIG. 4 or 6 every time the operator manipulates the mouse input device 22 to locate a mouse cursor on the image switching button and then to click the mouse button. In response to the click operation, the CRT display 26 switches display of images.

The CRT display 26 may display an indication of a kind of a presently-displayed image at a corner of the display region 27. For example, the CRT display 26 may display that the presently-displayed image is the original image while displaying the original image. The CRT display 26 may display that the presently-displayed image is the color-adjusted image while displaying the color-adjusted image. In this case, the CRT display 26 may preferably display which of the inputted color-adjustment values, the increased color-adjustment values, and the decreased color-adjustment values is used to adjust the presently-displayed image.

When the display region 27 is relatively large with respect to the size of the images, the CRT display 26 may display the image kind indication outside of the image but within the display region 27. The operator may shift the image kind indication to his/her desired position in the display region 27.

In the second embodiment, the first color-adjusted image is obtained through color-adjusting the original image with the operator's designated adjustment values ΔR0, ΔG0, and ΔB0. Additionally, the increased color adjustment values ΔR1, ΔG1, and ΔB1 are obtained through increasing the values ΔR0, ΔG0, and ΔB0, and the decreased color adjustment values ΔR2, ΔG2, and ΔB2 are obtained through decreasing the values ΔR0, ΔG0, and ΔB0. The second and third color-adjusted images are obtained through color-adjusting the original image with the thus changed adjustment values ΔR1, ΔG1, and ΔB1 and ΔR2, ΔG2, and ΔB2. However, the CPU 12 may calculate only the increased adjustment values ΔR1, ΔG1, and ΔB1 and produce the second color-adjusted image. The CRT display 26 may display only the original image, the first color-adjusted image, and the second color-adjusted image. Similarly, the CPU 12 may calculate only the decreased adjustment values ΔR2, ΔG2, and ΔB2 and produce the third color-adjusted image. The CRT display 26 may display only the original image, the first color-adjusted image, and the third color-adjusted image.

Alternatively, the operator may designate more than one set of color-adjustment values ΔR0, ΔG0, and ΔB0 to control the device 2 to produce more than one first color-adjusted images.

As described above, according to the color adjustment device of the present invention, two or more images, which are produced from the same image data but which are adjusted to have different color states, are displayed alternately on the same position of the screen at a predetermined timing. Accordingly, the operator can observe those images while continuously watching the same position on the screen. The operator can compare those images within a short period of time. Accordingly, the operator can easily compare the color states of those images with high accuracy. Because each of the images is displayed entirely over the screen, the operator can observe color states of even the intricate portions in the images.

In more concrete terms, according to the color adjustment device of the present invention, a set of image data is stored in an image storage unit. The image data can be displayed on a screen. When the operator inputs his/her desired color adjustment data, color state of the set of image data is adjusted based on the inputted color adjustment data. As a result, at least one set of color-adjusted image data is produced. The display is controlled to alternately display the set of image data and the at least one set of color-adjusted image data at the same position on the screen at a predetermined timing. In the embodiment, the display is controlled to display one of the set of image data and the at least one set of color-adjusted image data when a predetermined time period elapses after the display displays at the latest timing another one of the set of image data and the at least one set of color-adjusted image data. In other words, the display is controlled to alternately display the set of image data and the at least one set of color-adjusted image data at a predetermined time interval.

When a display switch stop instruction is inputted to stop alternately displaying the set of image data and the at least one set of color-adjusted image data, the display is controlled to continuously display either one of the set of image data and the at least one set of color-adjusted image data that is being displayed when the display switch stop instruction is inputted. In this case, the color state of the image data, thus continuously displayed on the screen, may be further adjusted according to newly inputted color adjusted data. The color state of the image data, thus continuously displayed on the screen, may be stored.

The display may be controlled to switch displaying one of the set of image data and the at least one set of color-adjusted image data when such an instruction is inputted.

In the case where the display is controlled to alternately display one set of image data and at least two sets of color-adjusted image data, an instruction can be inputted to change an order, in which the display is controlled to display those sets of data. In response to the instruction, the display is controlled to display those sets of image data in the changed order.

The color state of the set of image data is changed with a changing amount, indicated by the inputted color adjustment data, so that a set of color-adjusted image data is produced. The color state of the set-of image data may also be changed with an increased changing amount so that a set of largely-adjusted image data is produced. The color state of the set of image data may also be changed with a decreased changing amount so that a set of slightly-adjusted image data is produced. The image data and the color-adjusted image data may be displayed together with at least one of the largely-adjusted image data and the slightly-adjusted image data. Observing those image data, the operator can easily know whether the operator's inputted adjustment data has a too large amount or a too small amount. The operator can therefore correct his/her inputted adjustment data.

What is claimed is:

1. A color adjustment device for adjusting color display state of image data, the device comprising:

storage means for storing a set of image data;

display means provided with a screen, the display means being capable of displaying a color image on the screen;

color adjustment data input means for inputting color adjustment data;

color adjusting means for adjusting color state of the set of image data based on the inputted color adjustment data to thereby produce at least one set of color-adjusted image data;

display control means for controlling the display means to alternately display the set of image data and the at least one set of color-adjusted image data at the same position on the screen at a predetermined timing, thereby allowing a user to easily compare color state of the set of image data and color state of the at least one set of color-adjusted image data: and instruction input means for enabling the user to input his/her instruction based on the compared result.

2. A color adjustment device as claimed in claim 1, wherein the display control means controls the display means to display one of the set of image data and the at least one set of color-adjusted image data when a predetermined time period elapses after the display means displays at the latest another one of the set of image data and the at least one set of color-adjusted image data.

3. A color adjustment device as claimed in claim 2, wherein the display control means controls the display means to display the set of image data and the at least one set of color-adjusted image data alternately at a predetermined time interval.

4. A color adjustment device as claimed in claim 1, wherein the instruction input means includes image selection means for enabling the user to input his/her instruction to select a desired one of the set of image data and the at least one set of color-adjusted image data when the desired one is being displayed on the screen.

5. A color adjustment device as claimed in claim 1, wherein the instruction input means enables the user to input his/her instruction, wherein the display control means controls the display to display one of the set of image data and the at least one set of color-adjusted image data when the user inputs the instruction.

6. A color adjustment device as claimed in claim 5, wherein the instruction input means includes stop instruction input means for enabling the user to input his/her display switch stop instruction for stopping alternately displaying the set of image data and the at least one set of color-adjusted image data, and wherein the display control means includes display switch stopping means for controlling, in response to the inputted stop instruction, the display means to continuously display either one of the set of image data and the at least one set of color-adjusted image data that is being displayed when the user inputs the display switch stop instruction.

7. A color adjustment device as claimed in claim 6, wherein the stop instruction input means includes image selection instruction means for enabling the user to input his/her image selection instruction when his/her desired one of the set of image data and the at least one set of color-adjusted image data is being displayed on the screen, thereby selecting his/her desired image data, the display switch stopping means controlling, in response to the inputted image selection instruction, the display means to continuously display his/her selected image data.

8. A color adjustment device as claimed in claim 7, wherein the storage means newly stores the one of the set of image data and the at least one set of color-adjusted image data that is selected by the user and that is continuously displayed by the display means as controlled by the display switch stopping means.

9. A color adjustment device as claimed in claim 8, wherein the instruction input means includes color adjustment retrial means for enabling the user to input his/her instruction to control the input means to input new adjustment data and to control the color adjusting means to adjust, according to the newly inputted color adjustment data, the one of the set of image data and the at least one set of color-adjusted image data that is continuously displayed by the display means as controlled by the display switch stopping means and that is newly stored in the storage means.

10. A color adjustment device as claimed in claim 8, further comprising image output means for outputting his/her desired image data that is continuously displayed by the display means as controlled by the display switch stopping means and that is newly stored in the storage means.

11. A color adjustment device as claimed in claim 1, wherein the color adjusting means adjusts color state of the set of the image data based on the inputted color adjustment data to thereby produce at least two sets of color-adjusted image data, the display control means controlling the display means to alternately display the set of image data and the at least two sets of color-adjusted image data, wherein the instruction input means includes order changing input means for enabling the user to input an instruction to change an order in which the display control means controls the display means to display the set of image data and the at least two sets of color-adjusted image data, and wherein the display control means includes display order changing means for controlling, in response to the inputted order change instruction, the display means to alternately display the set of image data and the at least two sets of color-adjusted image data in the changed order.

12. A color adjustment device as claimed in claim 1, wherein the color adjusting means adjusts color state of the set of the image data based on the inputted color adjustment data to thereby produce a set of color-adjusted image data, and wherein the color adjusting means further includes adjustment data changing means for changing the inputted color adjustment data into changed color adjustment data, the color adjusting means adjusting color state of the set of the image data also based on the changed color adjustment data to thereby produce a set of changed color-adjusted image data, the display control means controlling the display means to alternately display the set of image data, the set of color-adjusted image data, and the set of changed color-adjusted image data.

13. A color adjustment device as claimed in claim 12, wherein the adjustment data changing means increases the inputted color adjustment data into increased color adjustment data, which is indicative of a larger adjustment amount relative to an adjustment amount indicated by the inputted color adjustment data, the color adjusting means adjusting color state of the set of the image data based on the increased color adjustment data, to thereby produce a set of largely-adjusted image data, the display control means controlling the display means to alternately display the set of image data, the set of color-adjusted image data, and the set of largely-adjusted image data.

14. A color adjustment device as claimed in claim 13, wherein the adjustment data changing means also decreases the inputted color adjustment data into decreased color adjustment data, which is indicative of a smaller adjustment amount relative to an adjustment amount indicated by the inputted color adjustment data, the color adjusting means also adjusting color state of the set of the image data based on the decreased color adjustment data, to thereby produce a set of slightly-adjusted image data, the display control means controlling the display means to alternately display the set of image data, the set of color-adjusted image data, the set of largely-adjusted image data, and the set of slightly-adjusted image data.

15. A color adjustment device as claimed in claim 12, wherein the adjustment data changing means decreases the inputted color adjustment data into decreased color-adjustment data, which is indicative of a smaller adjustment amount relative to an adjustment amount indicated by the inputted color adjustment data, the color adjusting means adjusting color state of the set of the image data based on the decreased color adjustment data, to thereby produce a set of slightly-adjusted image data, the display control means controlling the display means to alternately display the set of image data, the set of color-adjusted image data, and the set of slightly-adjusted image data.

16. A color adjustment device as claimed in claim 1, wherein the color adjustment data input means enables the user to input his/her desired color adjustment data.

17. A color adjustment device as claimed in claim 1, wherein the instruction input means includes color adjustment retrial means for enabling the user to input his/her instruction to control the input means to input new adjustment data and to control the color adjusting means to retry adjusting color state of the set of image data according to the newly inputted color adjustment data.

18. A color adjustment device for adjusting color display state of image data, the device comprising:

input means for inputting image data;

display means provided with a screen, the display means being capable of displaying a color image on the screen;

display control means for controlling the display means to alternately display a plurality of images at the same position on the screen, the plurality of images being produced from the inputted image data to present different color-adjusted states, thereby allowing a user to easily compare the displayed plurality of images; and color-adjusted state selection means for enabling the user to select one of the plurality of images.

19. A color adjustment device as claimed in claim 18, wherein the display control means includes:

input means for inputting color adjustment data;

color adjusting means for adjusting color state of the image data based on the inputted color adjustment data to thereby produce color-adjusted image data; and a display controller for controlling the display means to alternately display an Image based on the image data and a color-adjusted image based on the color-adjusted image data at the same position on the screen.

20. A color adjustment device as claimed in claim 19, wherein the display control means further includes: adjustment data changing means for changing the inputted color adjustment data into changed color adjustment data, the color adjusting means adjusting color state of the image data also based on the changed color adjustment data to thereby produce changed color-adjusted image data, the display controller controlling the display means to display the image based on the image data, the color-adjusted Image based on the color-adjusted image data, and a further changed color-adjusted image based on the changed color-adjusted image data.

* * * * *